No. 772,892. PATENTED OCT. 18, 1904.
F. LAUHOFF.
PROCESS OF TREATING TOBACCO STEMS, &c.
APPLICATION FILED DEC. 10, 1897.
NO MODEL. 3 SHEETS—SHEET 1.

WITNESSES
O. B. Baenziger
Mary Hickey

INVENTOR.
Frank Lauhoff
By his Attorney
Newell S. Wright

No. 772,892. PATENTED OCT. 18, 1904.
F. LAUHOFF.
PROCESS OF TREATING TOBACCO STEMS, &c.
APPLICATION FILED DEC. 10, 1897.
NO MODEL. 3 SHEETS—SHEET 2.

WITNESSES
INVENTOR
Frank Lauhoff
By his Attorney
Newell S. Wright

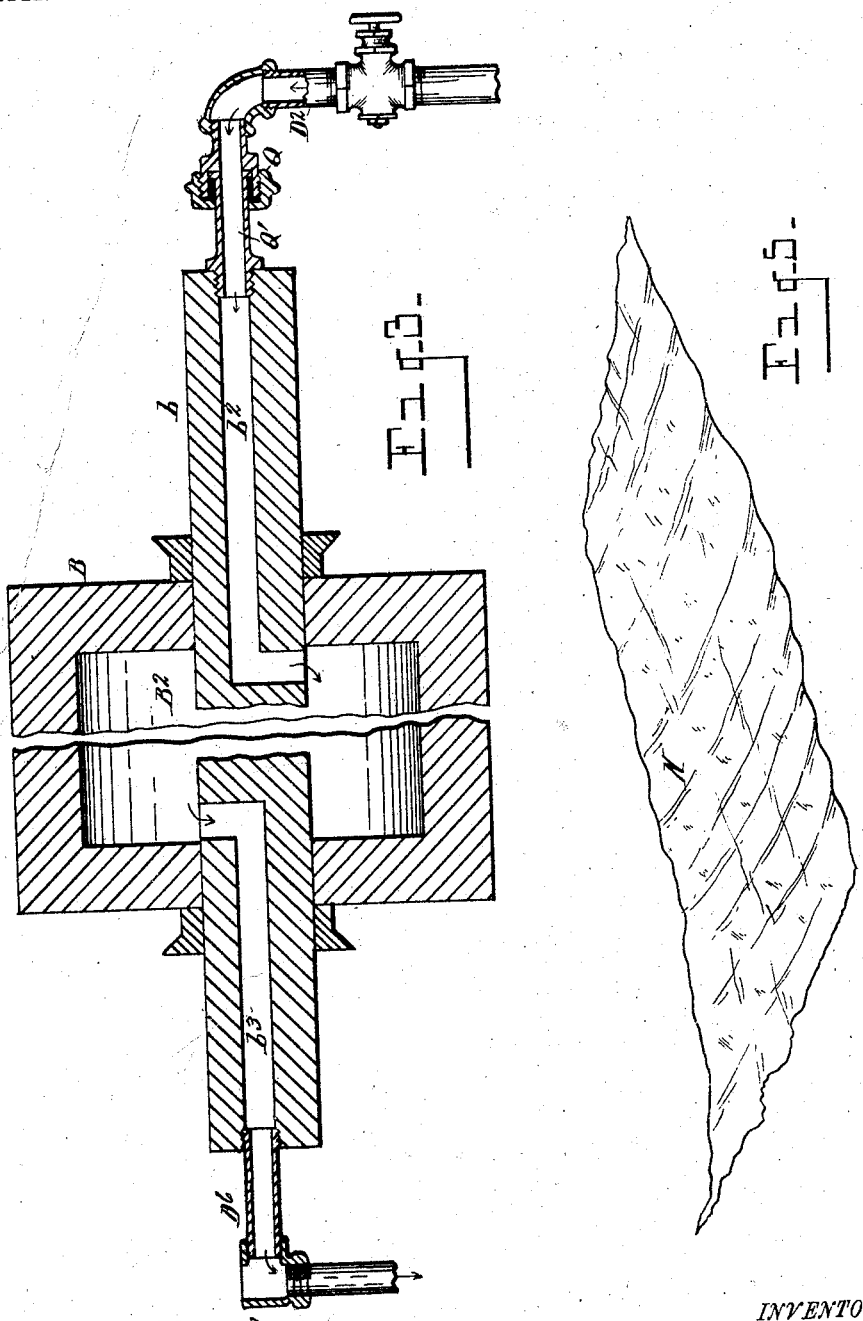

No. 772,892. Patented October 18, 1904.

UNITED STATES PATENT OFFICE.

FRANK LAUHOFF, OF DETROIT, MICHIGAN, ASSIGNOR TO THE AMERICAN TOBACCO COMPANY, A CORPORATION OF NEW JERSEY.

PROCESS OF TREATING TOBACCO-STEMS, &c.

SPECIFICATION forming part of Letters Patent No. 772,892, dated October 18, 1904.

Application filed December 10, 1897. Serial No. 661,332. (No specimens.)

*To all whom it may concern:*

Be it known that I, FRANK LAUHOFF, a citizen of the United States, residing at Detroit, county of Wayne, State of Michigan, have invented a certain new and useful Improvement in Processes of Treating Tobacco-Stems and the Product Thereof; and I declare the following to be a full, clear, and exact description of the invention, such as will enable others skilled in the art to which it appertains to make and use the same, reference being had to the accompanying drawings, which form a part of this specification.

My present invention has for its object the process of treating tobacco-stems and the product thereof hereinafter described and claimed, and illustrated in the accompanying drawings, in which—

Figure 1:
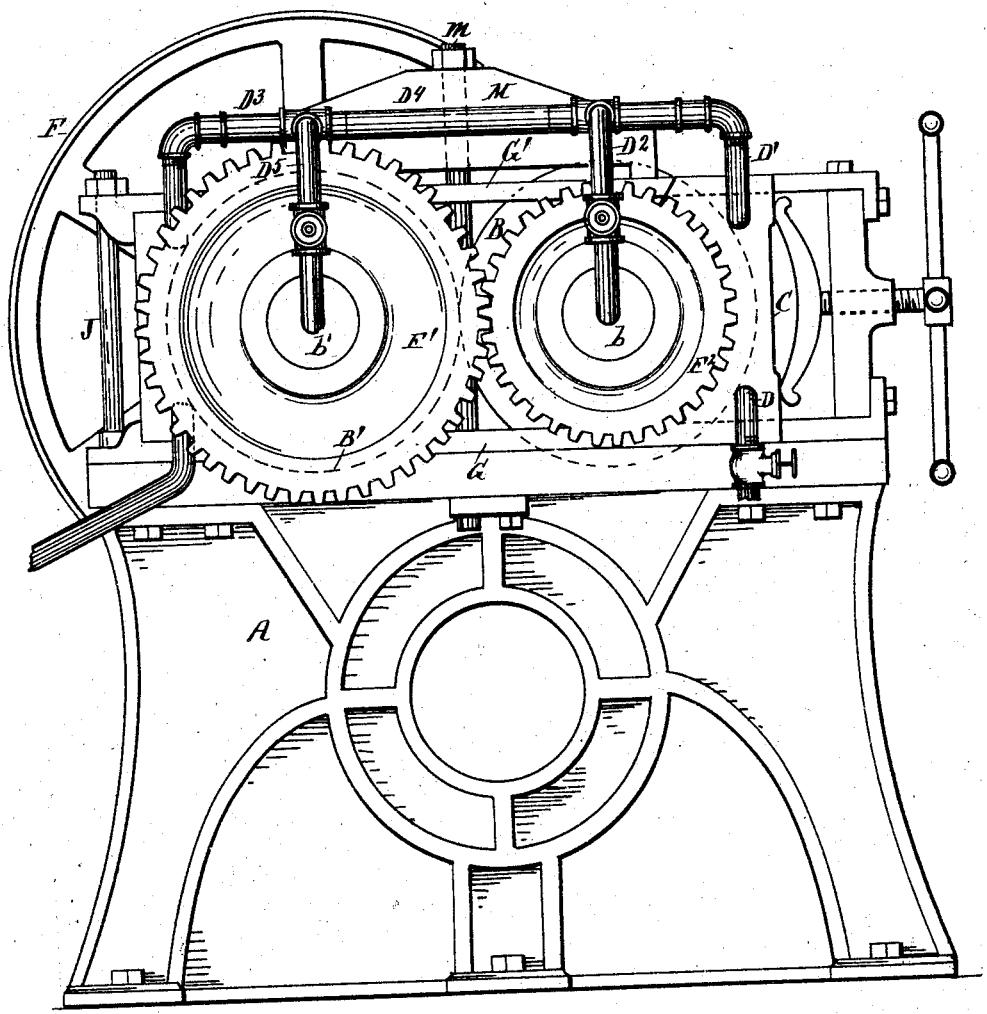
Figure 2:
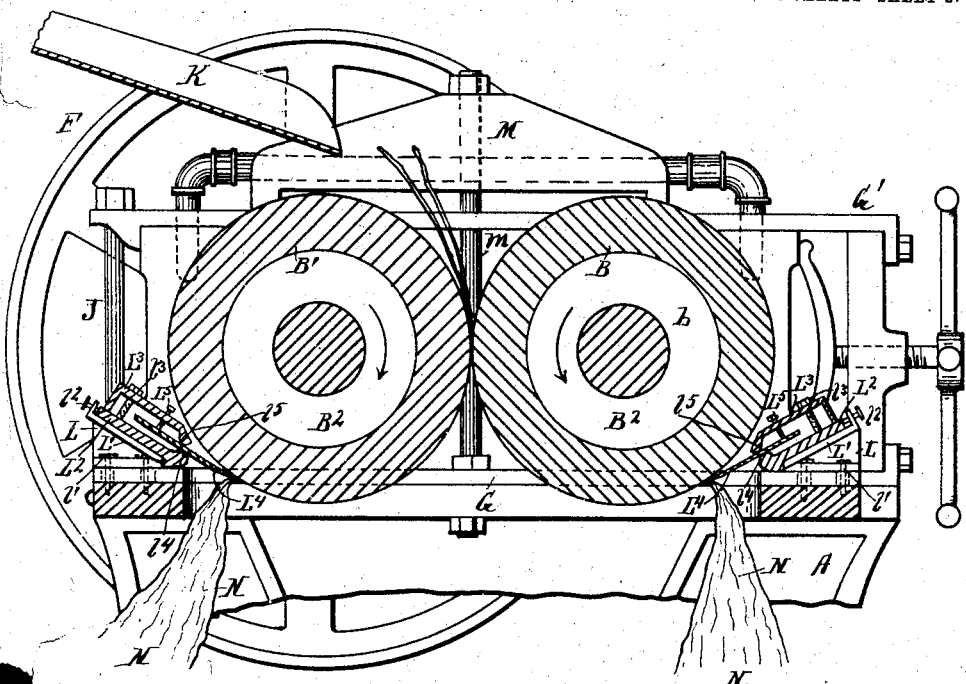
Figure 4:
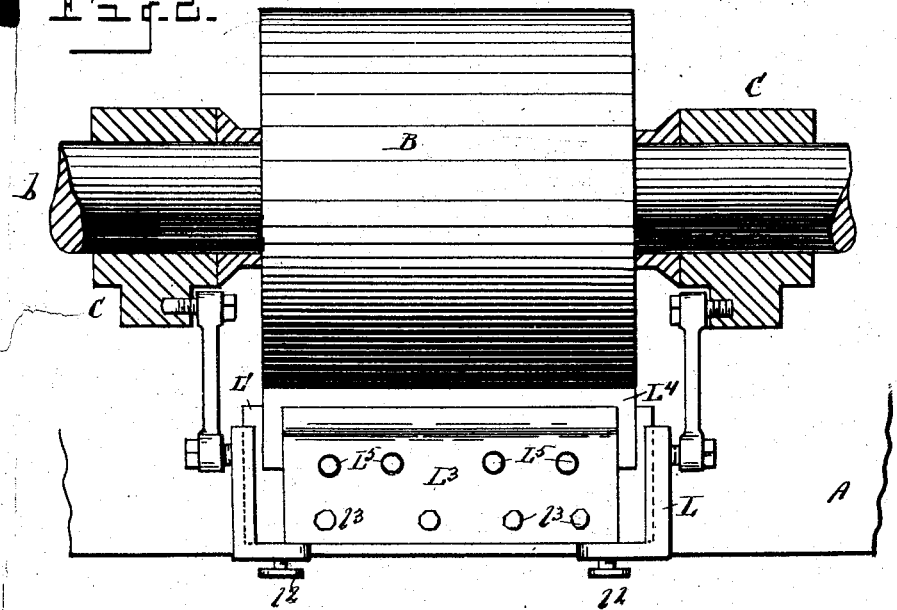

Figure 1 is a side elevation. Fig. 2 is a central vertical cross-section. Fig. 3 is a vertical longitudinal section through one of the rolls and its shafts. Fig. 4 is a view, partly in plan and partly in horizontal section, showing portions of the device; and Fig. 5 is a view illustrating a sample of the film or article produced by my improved process.

Heretofore, as is well known, tobacco-stems have been almost altogether a waste product in the manufacture of various kinds of tobacco on account of the inability heretofore to utilize the stems to any very considerable extent. My invention aims, however, to convert or transform the stems of the tobacco-leaves into a thin film or sheet, and thereby produce a novel product which may be utilized in the manufacture of certain kinds of tobaccos—as granulated smoking-tobacco, for example—without injuring the quality thereof or cheapening its value. The product resulting from the process of treating the tobacco-stems may be utilized to some extent in the manufacture of other than granulated smoking-tobacco, and I would have it understood that I do not limit myself solely to any one use to which it may be put, as my invention contemplates any and all uses to which the product may be found adapted.

To illustrate the method of carrying out my improved process for treating tobacco-stems, I have shown in the drawings submitted herewith a machine effectually adapted for that purpose, said machine being designed to flatten the stems into a thin film or sheet, the stems being reduced in carrying out my improved process to a very thin tissue readily granulated, if desired, the product having much the appearance of the leaf portions of the tobacco-leaves stripped from the stems. This thin tissue may be granulated by any suitable means in the same manner as the natural leaf.

The mechanism herewith illustrated forms the subject-matter of a separate application filed by me March 27, 1897, Serial No. 629,481.

My improved process may be carried out as follows, and to illustrate the same in the accompanying drawings, A represents any suitable support upon which are mounted two rotatable flattening-rolls B and B', having smooth contact-surfaces, one of said rolls, as the roll B, being rotatable at a higher rate of speed than the other, thereby giving to the two rolls differential peripheral speeds, causing a drawing pressure upon the stems fed therethrough and at the same time causing considerable friction and the consequent heating of the rolls. I do not limit myself solely to the friction of the rolls for heating the same, however, as they may be heated in any desired manner, as by steam, hot water, or the application of heat in any form to the inner sides of the rolls. It is desirable to have the rolls heated to a proper temperature to secure satisfactory results in the process of treating the tobacco-stems, and means must be provided to regulate the temperature of the rolls, so that the temperature may be held at a uniform or desired degree of heat, inasmuch as too high a temperature of the rolls would render the machine incapable of proper operation, as the flattened product will be liable to be baked upon the rolls, and it is very essential, therefore, that means be provided to govern the temperature, so that it may be regulated as desired. To this end my invention contemplates constructing the rolls B B' hollow, as shown, and also to construct the axles or shafts *b b'* of said rolls, respectively, each with a water-inlet channel $b^2$, communicating with the inner chamber $B^2$ of the roll, each axle being also constructed with an outlet-channel $b^3$, communicating with the said chamber of the roll, thereby effectually providing for water circulation through the shafts of the rolls to cool said shafts in their bearings and also to cool the rolls to their proper temperature.

C denotes the boxes of the shafts of the rolls through which water is preferably circulated. To provide for the required circulation in order to regulate the temperature of the rolls, I prefer to provide a main feed-water pipe D, which may lead into one of the boxes C, as at the base thereof, an outlet-pipe D' leading therefrom. From the pipe D' may lead a pipe $D^2$ into the shaft of the adjacent roll. The pipe D' may also be connected with an additional pipe $D^3$, as by a flexible or hose connection $D^4$, the pipe $D^3$ being led into the other box in a similar manner to that already described on the same side of the machine. A pipe $D^5$ may also be led from the pipe $D^3$ into the shaft of the other roll. The water led into the shafts of the rolls is conducted into the interior chambers of the rolls and is discharged therefrom at the opposite side of the machine, as through pipes $D^6$. It will be observed that the water-pipes are arranged so as to feed a fresh supply of water continuously through the rolls, the rolls being fed by the two pipes $D^2$ and $D^5$. The water after passing through the corresponding roll is not returned through the other roll, the two rolls being provided with independent discharges of the water therefrom, so that each roll is thus provided with its own water circulation, whereby both rolls may be kept of corresponding temperature. The inlet-pipes connected into the corresponding rolls are preferably connected thereinto by means of an intervening stuffing-box (indicated at Q) of any suitable construction, a pipe Q' rotating with the roll having a rotatable connection in the stuffing-box. So, also, the outlet-channels of the shafts of the rolls, at the opposite ends thereof, preferably discharge into funnels $d$, through intervening pipes $D^6$, said pipes $D^6$ being rotatable with the corresponding rolls and revolubly connected into the corresponding funnels.

The rolls may be driven in any desired manner, as by a driving-pulley F upon one of the shafts of the rolls, the opposite ends of the shafts being geared together, as by gears F' and $F^2$, to give a positive and firm movement to said rolls. The support A may be provided with a guide or way G on each side of the machine, upon which the boxes rest, the machine being also provided with upper guides or ways G', located at the tops of the boxes, said guides being secured upon the support in any suitable manner, as by bolts J, to hold the boxes firmly in position.

In carrying out my process the tobacco-stems are fed to the rolls in any suitable manner, as upon a feeding-chute, (indicated at K.)

M denotes bridges at the sides of the machine, extending across from one box to the other at each side of the machine to hold the boxes more snugly in position. These bridges may be fastened upon the support or frame of the machine in any suitable manner, as by bolts $m$. To flatten the stems to a tissue or thin film requires a very considerable degree of pressure between the rolls, in consequence of which the rolls must work sufficiently close together to reduce the stems to the required thinness or to the thickness of thin tissue-paper or film N. The rolls being of the required temperature and in operation, the flattened product or film will stick firmly to the rolls, chiefly to the roll rotating at the highest speed. To separate the product or film from the rolls, a sharp cutting device must be employed, the same being set sufficiently close to the adjacent roll to effectually cut the film off therefrom, the film thus cut off or severed from the roll being in the form of a thin sheet, resembling, as already stated, the appearance of the natural leaf stripped from the stem. To separate the product from the rolls, as shown in the drawings, the cutting mechanism may consist of brackets L, having an adjustable engagement upon the support A of the machine in any suitable manner, as by bolts $l'$. The brackets L may be constructed with a base or bed L', upon which rests an adjustable plate or knife-holder $L^2$, preferably made reciprocatory by means of adjusting-screws $l^2$, engaged with the base or bed L' and with said plate or knife-holder.

$L^3$ denotes a cap serving as a clamp, also to hold a cutting-blade or knife $L^4$ between said cap and the plate. Said cap may be engaged upon said plate by means of screws $l^3$. The plate $L^2$ and the cap $L^3$ are constructed with curved bearings, forming fulcrums for the cutter-blade toward their lower edges on their adjacent faces, as indicated at $l^4$ and $l^5$, whereby the edge of the knife may be tilted or adjusted vertically, as may be required, the knife being permitted a vertically-rocking movement upon said fulcrums, whereby the edge of the knife may be adjusted vertically by means of screws $L^5$ passing through the cap and bearing upon the knife-blade. In this manner the edges of the knife may be set snugly against the adjacent rolls to effectually cut off the flattened product therefrom by means of the set-screws $L^5$, located in different positions along the length of the knife. The knife may be evenly and uniformly set from end to end in proper contact with the surface of the adjacent roll to secure the desired result and an even cutting off of the stock from the roll. When the product is cut off from the rolls by the knives, the rolls are left perfectly clean to the rear of the knife-edge, so that as the rolls rotate they are in condition to receive a succeeding coating of the stems fed thereto and flattened thereby. This mechanism is fully described in my application above referred to. The stems are preferably steamed somewhat before being fed to the machine and may be fed to the machine in a warm or heated condition, or they may be moistened or otherwise made pliable in any desired manner. The cells of the tobacco-stems contain a gummy substance—as cellulose, for example—and other substances which when the stem is heated and passed through the flattening-rolls with a drawing pressure and the stem is flattened to a tissue will coat the product or film to some extent with a film or glaze analogous in appearance to that of the natural leaf portion. In carrying out my improved process the heat softens the contents of the cells in the stems, enabling the cellular contents when thus softened under heat and subjected to the drawing pressure of the rolls to be more effectually spread over the surface of the flattening product. The drawing pressure of the rolls thus draws out the cellular material of the stems and spreads it over the woody fiber, so as to produce a thin sheet or tissue closely resembling the natural leaf.

In carrying out my process the woody fiber of the stem is so transformed in the resultant film as to no longer bear the appearance of a fibrous construction, so thoroughly is the stock flattened in a thin sheet or tissue.

In addition to using this product in the manufacture of granulated smoking-tobacco it may also be worked into long-cut smoking-tobacco, into plug-cut smoking-tobacco, as well as into other forms of tobacco preparations, to great advantage. When the stem is flattened in this manner, it will smoke like natural leaf products and will not swell or crawl in smoking, as will broken or cut stem products in burning.

What I claim as my invention is—

1. The herein-described process of treating tobacco-stems which consists in drawing out the stems and compressing the drawn-out material into a film or thin tissue by subjecting the stems in a pliable condition to compression between rollers having different peripheral speeds and heated to a uniform temperature, substantially as described.

2. The herein-described process of treating tobacco-stems which consists in drawing out the stems and compressing the drawn-out material into a film or thin tissue by subjecting the stems in a pliable condition to compression between rollers having different peripheral speeds and heated to a uniform temperature, and granulating the film or thin tissue thus produced, substantially as described.

3. The herein-described process of treating tobacco-stems which consists in drawing out the stems and compressing the drawn-out material into a film or thin tissue by subjecting the stems in a pliable condition to compression between rollers having different peripheral speeds and maintaining a uniform temperature of the rolls substantially as described by circulating liquid through the rolls.

4. The herein-described process of treating tobacco-stems which consists in drawing out the stems and compressing the drawn-out material into a film or thin tissue by subjecting the stems in a pliable condition to compression between rollers having different peripheral speeds and maintaining a uniform temperature of the rolls substantially as described by circulating liquid through the rolls, and granulating the film or thin tissue thus produced.

5. The herein-described process of treating tobacco-stems consisting of subjecting the stems in a pliable condition to compression between rollers having different peripheral speeds and heated to a uniform temperature substantially as described, whereby the material is simultaneously drawn out and compressed into a film or thin tissue and caused to adhere to said rolls, and then cutting said film or tissue off said rolls.

6. The herein-described process of treating tobacco-stems consisting of moistening the stems and then subjecting the stems in a pliable condition to compression between rollers having different peripheral speeds and heated to a uniform temperature, substantially as described.

7. As a new article of manufacture the herein-described homogeneous film or thin tissue consisting of flattened tobacco-stems, substantially as described.

8. As a new article of manufacture the herein-described granulated film or thin tissue consisting of flattened tobacco-stems, substantially as described.

In testimony whereof I sign this specification in the presence of two witnesses.

FRANK LAUHOFF.

Witnesses:
N. S. WRIGHT,
O. B. BAENZIGER.